UNITED STATES PATENT OFFICE.

JAMES DOUGLAS, OF NEW YORK, N. Y.

METHOD OF SEPARATING AND RECOVERING COPPER.

SPECIFICATION forming part of Letters Patent No. 506,985, dated October 17, 1893.

Application filed May 16, 1892. Serial No. 433,210. (No specimens.)

*To all whom it may concern:*

Be it known that I, JAMES DOUGLAS, a subject of the Queen of Great Britain, residing at the city of New York, in the county of New York, State of New York, have invented certain new and useful Improvements in Methods of Separating and Recovering Copper; and I do hereby declare the following to be a full, clear, and exact description of the invention, such as will enable others skilled in the art to which it appertains to make and use the same.

This invention relates to the method of separating and recovering copper, and is designed, chiefly, as an improvement on the methods set forth in Patents No. 86,754 and No. 364,174, granted to Thomas Sterry Hunt and myself respectively, February 9, 1869, and May 31, 1887. The said Patent No. 86,754 describes a method of extracting copper from its ores by a mixed solution of chloride of iron, and common salt. The Patent No. 364,174 discloses a method for more effectually attaining the same end by acidulating the chloride of iron by injecting into the solution sulphurous acid. When using either method on sulphureted ore there accumulates in the solution, iron salts, to the point soon of supersaturation, and as this excess of iron is combined with more or less chlorine, which in some localities is valuable, it is wasteful to throw away any portion of this saturated solution.

In order to recover the chlorine and obtain the iron as sulphate I agitate oxid of copper in a portion of the solution containing chloride and sulphate of iron and inject during the agitation sulphurous acid gas drawn from kilns or furnaces in which sulphureted ore is being roasted. The oxid of copper is best derived from oxidized copper ore or matte. The result of the reaction between chlorine of iron, oxid of copper and sulphurous acid gas is the formation of sub-chloride of copper and free acid. At first the sub-chloride of copper formed is dissolved by chloride of iron, but as the chloride leaves the iron, and combines with the copper, the solvent power of chlorine of iron diminishes, and sub-chloride of copper separates, till virtually all the chlorine is combined with the copper to form insoluble sub-chloride, and all of the soluble iron remains in the solution as sulphate of iron. If silver be present in the ore or matte it will be found as chloride of silver mixed with the sub-chloride of copper in the insoluble residue. There results therefore from this reaction two products. First,—insoluble sub-chloride of copper and chloride of silver (when silver is present) mixed with the insoluble ingredient of the ore or matte which yielded the copper, and second,—an acid solution charged and almost saturated with sulphate of iron. These products should be treated as follows: First,—the sub-chloride of copper (and silver if present) can be dissolved and separated from the residue by reagitating them with hot brine, or with a portion of the chloride of iron solution, if chloride of iron, or chloride of iron and common salt, have been used as a solvent. This solution will contain the copper as sub-chloride, and the silver (if any be present) as chloride. The silver can be separated for the solution by metallic copper, and the copper by metallic iron. There will result in this case a solution of chloride of iron which can be added to the original bath and will restore to it all the chlorine which was in the mixed solution of chloride and sulphate of iron treated as above. Should brine be used to dissolve the sub-chloride of copper and chloride of silver from insoluble residue, it can be used repeatedly, the silver being recovered after each operation by precipitation with metallic copper, and the copper as sub-oxid of copper with milk of lime, or as metallic copper with metallic iron. The insoluble residue, consisting of the undissolved ingredients of the ore or matte, if it retains a notable amount of copper can be retreated with a fresh portion of the solvent. Second,—from the acid solution can be separated by crystallization the sulphate of iron. The mother liquors, after crystallizing out most of the iron salts, will contain free acid, and may be added to the bulk of the bath used for dissolving copper.

I do not claim the use of either chloride of iron or sulphurous acid as solvents.

What I do claim is—

The herein specified method of eliminating chlorine from a solution containing chloride of iron in which oxidized copper ore or matte is suspended consisting of, first, injecting sulphurous acid into the said solution until the chlorine has entirely or almost entirely passed into insoluble sub-chloride of copper and chloride of silver, leaving the iron in solution as sulphate, second,—recovering the insoluble sub-chloride of copper and chloride of silver by a solution of chloride of iron or other chloride, third,—precipitating the silver by copper and fourth,—precipitating the copper by iron.

In testimony whereof I affix my signature in presence of two witnesses.

JAMES DOUGLAS.

Witnesses:
 D. F. MITCHELL,
 A. J. HERNDON, Jr.